(No Model.)
G. W. COX.
HARNESS.
No. 246,661.                Patented Sept. 6, 1881.
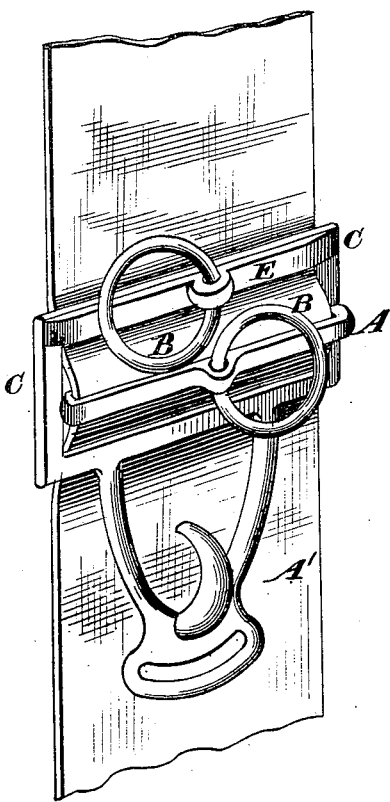
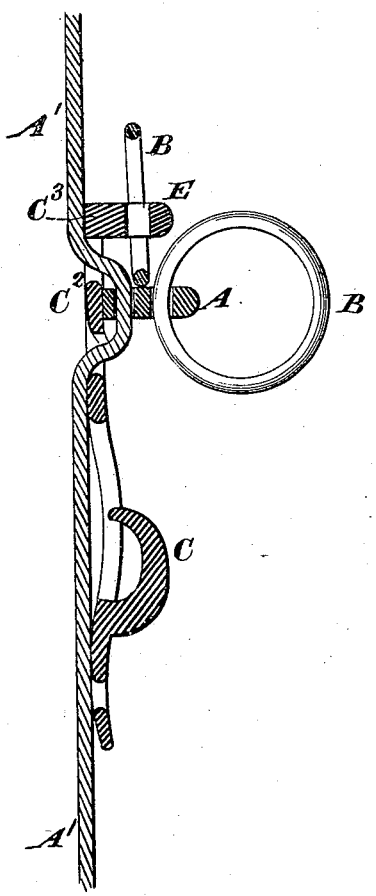
Witnesses.
A. Ruppert
C. M. Connell
G. W. Cox
Inventor.
Holloway & Blanchard
Atty

UNITED STATES PATENT OFFICE.

GUILFORD W. COX, OF COXVILLE, NORTH CAROLINA.

HARNESS.

SPECIFICATION forming part of Letters Patent No. 246,661, dated September 6, 1881.

Application filed March 17, 1881. (No model.)

*To all whom it may concern:*

Be it known that I, GUILFORD W. COX, a citizen of the United States, residing at Coxville, in the county of Pitt and State of North Carolina, have invented certain new and useful Improvements in Rein-Carriers for Harness; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to a harness for animals; and the object of my improvement is to combine with a trace-carrier a rein-carrier which is adapted for carrying the guiding-reins while plowing and cultivating crops and while the harness is being used for other purposes. I attain this object by the devices shown in the accompanying drawings, in which—

Figure 1 is a perspective view, showing a portion of a back-band such as is used upon the particular kind of harness commonly used in plowing in the southern portions of our country, and a trace-carrier for securing the band upon the animal; and it also shows a slide having formed in it a slot for the passage of the band, it being provided with a ring for carrying the reins; and Fig. 2 is a sectional elevation, showing the parts above enumerated and in their position.

Similar letters refer to similar parts in both of the figures.

It is well known that in certain sections of the country the harness used in plowing consists merely of a collar, tugs or traces, a band which passes around the animal, termed a "back-band," and a pair of reins. In a harness of this kind it is important that some provision be made for holding in position the guiding-reins upon the harness, so that they may not be allowed to drop too low down, and thus become entangled with the traces or get under the feet of the animals. My object, as before stated, is to provide for such and other purposes a combined trace and rein-carrier that shall serve such a purpose.

In the accomplishment of the above-named purpose I provide a bar, A, of cast or other metal, the length of which is somewhat greater than the width of the band A', in order that the slot formed in it may be made to receive the band without cramping it. Upon the outer portion of the bar A there is cast or otherwise secured a projecting portion, as shown in Fig. 1, which projecting portion is provided with an aperture, through which a ring, B, is passed, and in which it is held.

As shown in the drawings, and as I prefer to use this device, there is connected with the back band a trace-carrier, C, which may be of any suitable form, it being in the present case composed of three longitudinal bars, $C'$, $C^2$, and $C^3$, the central one being provided with pointed projections for holding the trace-carrier in position on the band, it being passed under the two outer bars and over the central one, as shown in Fig. 2. At the point upon the band where it passes over the central bar of the buckle the slotted bar A is placed, and the band is made to pass through the slot formed in it, it being held in position by the back-band, such position being the proper one to hold the guiding-reins out of the way of the other portion of the harness, and thus enable the driver to at all times have perfect control of them.

Having thus described my improvement, what I claim, and desire to secure by Letters Patent, is—

A trace-carrier provided with a rein-carrier consisting of a bar of metal secured to or upon the cross-bar of the trace-carrier, and with a ring for carrying the guiding-reins, substantially as set forth.

In testimony whereof I affix my signature in presence of two witnesses.

GUILFORD W. COX.

Witnesses:
 W. H. SMITH,
 ARCHD. COX.